United States Patent

[11] 3,623,145

[72] Inventors David W. Gregg
 Lafayette;
 Richard K. Pearson, Pleasanton, both of Calif.
[21] Appl. No. 40,653
[22] Filed May 26, 1970
[45] Patented Nov. 23, 1971
[73] Assignee The United States of America as represented by the United States Atomic Energy Commission

[54] HIGH-ENERGY CHEMICAL LASER SYSTEM
 10 Claims, 2 Drawing Figs.

[52] U.S. Cl. .................................................... 331/94.5
[51] Int. Cl. .................................................... H01s 3/22
[50] Field of Search .......................................... 331/94.5;
 252/301.2; 330/4.3

[56] References Cited
 UNITED STATES PATENTS
 3,510,797 5/1970 Nieuwpoort et al. .......... 331/94.5

OTHER REFERENCES

Spencer et al., Continuous-Wave Chemical Laser. International J. Chem. Kinetics, Vol. 1 (1969) pp. 493– 494.

Chemical Laser Operates on Rotational-Rotational Transitions. Laser Focus (October 1967) pp. 14 and 16.

Primary Examiner—William L. Sikes
Attorney—Roland A. Anderson

ABSTRACT: A high-energy chemical laser system wherein explosive gaseous mixtures of a reducing agent providing hydrogen isotopes and nitrogen-fluorine compounds are uniformly ignited by means of flash-photolysis or an electron beam. The resulting chemical explosion pumps a lasing chemical species, hydrogen, deuterium or tritium fluoride which is formed in the chemical reaction. The generated lasing pulse has light frequencies in the 3-micron range. Suitable nitrogen-fluorine gaseous compounds include tetrafluorohydrazine ($N_2F_4$), nitrogen-trifluoride ($NF_3$) difluorodiazine ($N_2F_2$), and suitable reducing agents including hydrogen ($H_2$) deuterium ($D_2$), tritium ($T_2$) diforane ($B_2H_6$) pentaborane ($B_5H_9$) and methane ($CH_4$), as well as combinations of the gaseous compound and/or molecular mixtures of the reducing agent.

PATENTED NOV 23 1971

3,623,145

INVENTORS
DAVID W. GREGG
BY RICHARD K. PEARSON

ATTORNEY:

HIGH-ENERGY CHEMICAL LASER SYSTEM

BACKGROUND OF THE INVENTION

The invention described herein was made in the course of, or under, Contract No. W-7405-Eng-48 with the United States Atomic Energy Commission.

This invention relates to explosion gas laser systems, and more particular to such a laser system which utilizes explosive gaseous mixtures of a reducing agent providing hydrogen, deuterium, or tritium and nitrogen-fluorine compounds uniformly ignited.

It is known the energy released in an exothermic chemical reaction can be used to "pump" a lasing medium which is a chemical species in the reaction. For example, the reaction of molecular hydrogen ($H_2$) and atomic fluorine (F) generates excited hydrogen fluoride (HF) which will lase, see Aviation Week and Space Technology, Jan. 12, 1970, page 17. Lasing mediums consisting of $H_2+XeF_4$, $H_2+OF_2$, $H_2+UF_6$, and $H_2+SbF_5$ are known using these prior known lasing mediums. However, high power pulsed chemical lasers have not been considered practical for a variety of reasons. The two primary objections to such prior known lasing systems are briefly discussed herebelow.

First, the chemical reaction rate inherently determines the pulse peak power, width and rise time of the laser pulse. In the chemical laser, the rate of pumping is a chemical reaction rate. Accordingly, for a fast rise time, high power, short laser pulse, there must be a comparably fast chemical pumping reaction. This also dictates that the volumetric initiation pulse be comparably fast.

Second, the nonuniformity of the fast exothermic chemical reactions has been disadvantageous to the prior known high power, pulsed chemical lasers.

Therefore, only an exothermic chemical reaction which has a lasing reaction species or product, which release energy suitable for pumping that lasing species at a sufficient rate to generate an extremely large population inversion, and which can be uniformly and rapidly initiated is suitable for high power pulsed lasing system. Additional desirable properties of a laser pumping chemical reaction are a low initial energy investment to obtain lasing, gaseous reaction products, and complete reaction of reactants.

SUMMARY OF THE INVENTION

The present invention provides a high power pulsed lasing system which utilizes an exothermic chemical reaction which has a lasing reaction species or product, which releases energy suitable for pumping that lasing species at a sufficient rate to generate an extremely large population inversion, and which can be uniformly and controllably initiated. This is accomplished by the utilization of gaseous mixtures of a reducing agent providing hydrogen isotopes and nitrogen-fluorine compounds.

The present invention involves the technique of providing the uniformity necessary in a lasing cavity of a chemical laser by uniformly initiating the chemical reaction of gaseous mixtures of hydrogen isotopes and nitrogen-fluorine compounds throughout the lasing cavity volume. This may be accomplished by flash-photolysis, using a very intense light source, or by an electron beam. An electron beam initiated chemical laser system is described and claimed in copending U.S. Pat. application, Ser. No. 40,652 filed May 26, 1970, entitled "Electron Beam-Initiated Chemical Laser System," assigned to the same assignee as this application.

Therefore, it is an object of this invention to provide a high energy, pulsed chemical laser system.

A further object of the invention is to provide a high energy chemical laser system which utilizes explosive gaseous mixtures of a reducing agent providing hydrogen isotopes and nitrogen-fluorine compounds.

Another object of the invention is to provide a high energy, pulsed chemical laser system which utilizes an explosive gaseous mixture which releases energy suitable for pumping a lasing reaction species at a sufficient rate to generate an extremely large population inversion and which can be uniformly and controllably initiated.

Another object of the invention is to provide an electron beam-initiated high power, pulsed chemical laser utilizing the reaction of hydrogen isotopes and nitrogen-fluorine.

Another object of the invention is to provide a flash-photolysis ignited high power, pulsed chemical laser utilizing explosive gaseous mixtures of hydrogen isotopes and nitrogen-fluorine compounds.

Another object of the invention is to provide a high energy, pulsed, electron beam-initiated chemical lasing system using an explosive gaseous mixture of a reducing agent providing hydrogen, deuterium or tritium and nitrogen-fluorine compounds.

Another object of the invention is to provide a high power, pulsed lasing system utilizing an exothermic chemical reaction which has a lasing reaction species; which releases energy suitable for pumping that lasing species at a sufficient rate to generate an extremely large population inversion; and which can be uniformly and controllably initiated.

Other objects of the invention will become readily apparent to those skilled in the art in view of the following description and accompanying drawings.

DESCRIPTION OF THE INVENTION

The invention is based on the discovery of an exothermic chemical reaction which has a lasing reaction species or product, which releases energy suitable for pumping that lasing species at a sufficient rate to generate an extremely large population inversion, and which can be uniformly and controllably initiated for high power pulsed lasing systems. Additional properties of the laser pumping chemical reaction are low initial energy investment to obtain lasing, gaseous reaction products, and complete reaction of reactant. This reaction is provided by an explosive gaseous mixture of a reducing agent providing hydrogen isotopes (hydrogen, deuterium, and tritium) and nitrogen-fluorine compounds uniformly ignited by means of flash-photolysis or an electron beam. The generated lasing pulse has light frequencies in the 3-micron range. Suitable nitrogen-fluorine gaseous compounds include $N_2F_4$, $NF_3$ and $N_2F_2$, while suitable reducing agents are $H_2$, $B_2H_6$, $B_5H_9$ and $CH_4$ or the deuterated versions of the same molecules, or combinations thereof. It should be noted, that from the limited tests thus far conducted, that while these compounds have been found to lase by electron beam initiation, certain of them, as discussed hereinafter have not lased by flash-photolysis ignition. However, the test results are preliminary and thus not conclusive.

Figure 1:
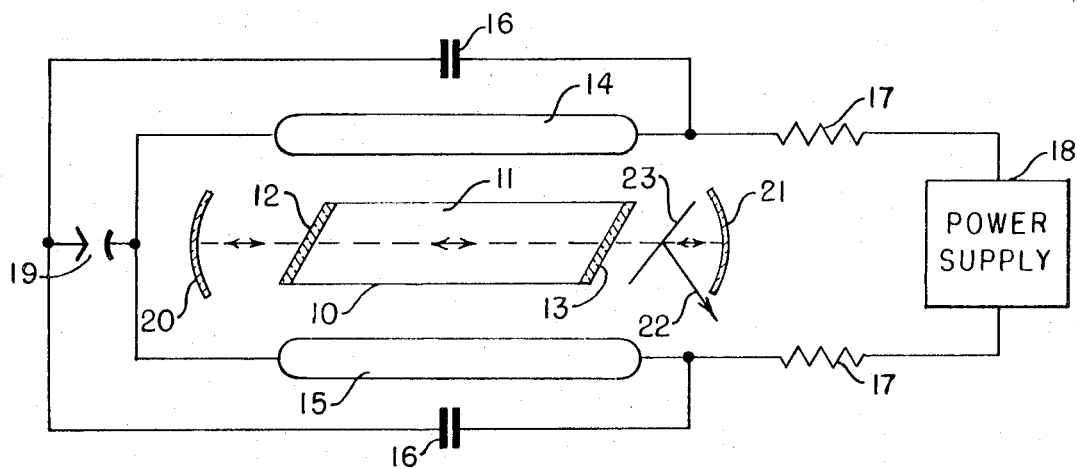
FIG. 1 is a schematic illustration of a flash-photolysis embodiment for carrying out the invention.

Specifically, it has been discovered that the following explosive gaseous mixtures will provide the desired chemical reaction described above: $H_2+N_2F_4$, $H_2+NF_3$, $H_2+N_2F_2$, $B_5H_9+N_2F_4$, $B_5H_9+NF_3$, $B_2H_6+NF_3$, $B_2H_6+N_2F_4$, $CH_4+N_2F_4$, $D_2+N_2F_4$ and $T_2+N_2F_4$. Currently, it has been determined that the above mixtures will lase when initiated by the electron beam technique described with respect to FIG. 2; and that the $H_2+NF_3$, $B_2H_6+NF_3$ and $B_5H_9+NF_3$ mixtures will not lase when initiated by the flash-photolysis (flashlamps) technique illustrated in FIG. 1. This further illustrates the importance of the above referenced electron beam-initiated chemical laser system.

Inasmuch as the flashlamps or flash-photolysis (see FIG. 1) testing to verify the inventive concept has been directed more extensively to the mixture of molecular hydrogen and tetrafluorohydrazine ($H_2+N_2F_4$), the following is set forth to illustrate the invention utilizing this technique: Laser action was achieved in the flashlamp (FIG. 1) initiated $H_2+N_2F_4$ mixtures at pressures ranging from 10 to 50 torr; the the laser emission, in the region of about 2.7 microns, is attributed to hydrogen fluoride (HF), a product of combustion.

Mixtures of $H_2+N_2F_4$ (two parts of $H_2$ to one part $N_2F_4$) at pressures ranging from 10 to 50 torr lased on vibrational-rotational lines of HF when subjected to intense flashes of light. This system provides an intense laser, requires a relatively small amount of light for initiation, burns to completion, and has all gaseous products. The flashlamp system using the novel $H_2+N_{2n}{}^F{}_4$ mixture is similar to the known $H_2XeF_4$ and $H_2OF_2$ lasers in this respect but different from the known $H_2+UF_6$ and $H_2+SbF_5$ systems which form solid products that cause scattering losses during lasing and eventually coat the laser windows which limits the life of the laser tube.

The flash-photolysis or flashlamp apparatus utilized in the $H_2+N_{2n}{}^F{}_4$ test described above is schematically illustrated in FIG. 1 and comprises a laser tube or vessel 10, having an active volume, for example, 15 cm. long by 0.5 cm. diameter, filed with an explosive gaseous mixture 11, such as $H_2+N_2F_4$. The laser tube 10 is provided at each end thereof with windows 12 and 13 positioned at Brewster's angle and constructed, for example, from barium fluoride ($BaF_2$), and is pumped by two flashlamps 14 and 15, (one on each side of tube 10) having, for example, a 15 cm. arc length. The flashlamp 14 and 15 were, for example, powered with two 0.3 $\mu$fd, 25 kv. capacitors 16 with a full pulse width of 3 $\mu$sec. The capacitors 16 are each connected through resistors 17 to a power source 18, the flashlamps 14 and 15 being activated by discharge of capacitors 16 through a spark gap switch 19. A pair of concave mirrors 20 and 21 are positioned at opposite ends of tube or vessel 10 at selected spaced locations and define the laser cavity with the light beam indicated at 22 being brought out by a beam splitter 23 positioned between window 13 and mirror 21. For example, the mirrors 20 and 21 were 10 meter-radius, gold-coated and spaced 60 cm. apart, with the beam splitter 23 being made of sodium chloride (NaC1). In the tests conducted on the $H_2+N_2F_4$ mixture, the laser output was detected using a monochromator Ge(Au) detector at 77° k. and a dual beam oscilloscope whereby the lasing pulse and the flashlamp pulse were traced simultaneously, the detecting and readout means are not illustrated since they do not constitute part of the present invention.

Figure 2:
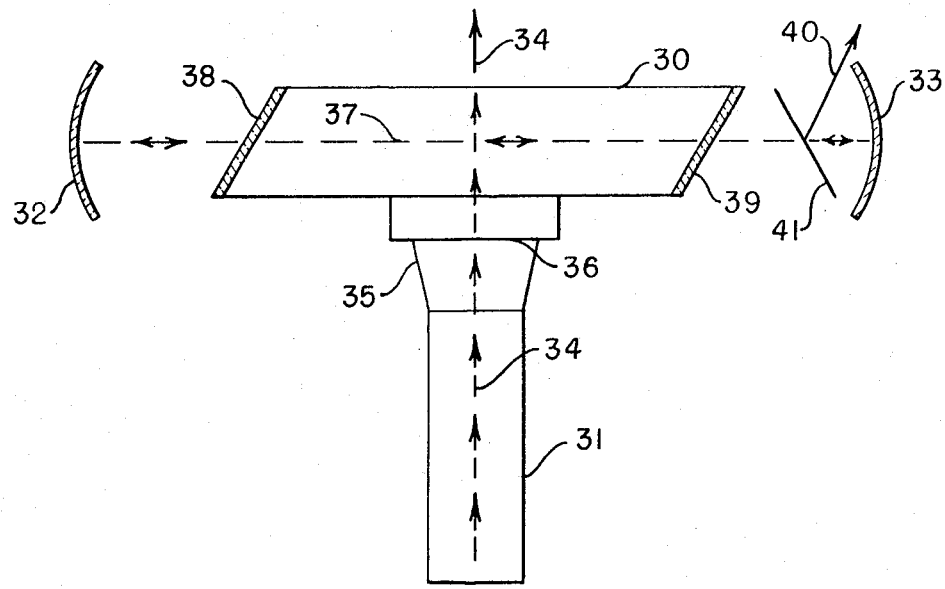
FIG. 2 is a schematic illustration of an electron beam embodiment for carrying out the invention.

Testing to verify the inventive concept utilizing the electron beam-initiated technique, utilizing the FIG. 2 apparatus, has been more extensively directed to the mixture of molecular hydrogen and tetrafluorohydrazine ($H_2+N_2F_4$) and the mixture of molecular hydrogen and nitrogen-trifluoride ($H_2+NF_3$) and the following is set forth to illustrate the invention utilizing this technique: Laser action was achieved in mixtures of $H_2+N_{2n}{}^F{}_4$ and $H_2+NF_3$ at pressures ranging from 10 to 100 torr using a 1.2 Mev., 50 ns. pulsed beam of electrons to volumetrically initiate the chemical reaction. The laser emission, in the region of 2.7 microns is attributed to hydrogen fluoride (HF), a product of combustion.

Mixtures of $H_2+N_2F_4$ and $H_2+NF_3$ (two parts $H_2$ to one part $N_2F_4$ or 1.5 parts $H_2$ to one part $NF_3$) at pressures ranging from 10 to 250 torr were found to lase on vibrational-rotational lines of HF, when subjected to a 50 ns. pulse of 1.2 Mev. electrons containing nominally 350 joules per pulse. This results in approximately 40 joules/gm. deposited directly in the gas mixture. Thus, the use of a beam of relativistic electrons, from the electron beam generator to initiate chemical lasers represents an entirely new form of "flash photolysis" which has features distinctly different from flashlamps when used for the volumetric ignition of chemical lasers. By using the electron beam initiation technique, large amounts of useful ignition energy are obtainable in short times compared to flashlamp systems. The apparatus used in the above testing is capable of delivering 500 joules in 50 ns., but still larger apparatus capable of delivering more energy in less time is within the present state of the art. Apparatus which deliver 10–20 joules in 3 ns. are readily available for testing where relatively small amounts of energy can be used and a very short initiation pulse is desired. It should be noted that these pulse widths are short compared to a single collision time in a gas at 10 torr and thus they give a true (point in time) volumetric initiation of a chemical reaction. Since the beam travels only slightly less than the speed of light the initiation is very fast. Another advantage of pulsed electron beams for initiation is their ability to penetrate large amounts of material (possibly high pressure material) with uniform energy deposition relative to flashlamp light. The apparatus used in the above tests, which produces 1.2 Mev. electrons can penetrate approximately 1 g./cm$^2$ of material with an energy deposition profile that is significantly more uniform than the normal exponential loss profile expected with light. Also this energy deposition profile and the total penetration can be controlled to some extent by controlling the energy of the electrons. Electron beams can also initiate reactions, such as $H_2+NF_3$, $B_2H_6+NF_3$ and $B_5H_9+NF_3$, that are not initiatable by flashlamps since they will dissociate molecules that absorb far in the ultraviolet beyond the transmission band of flashlamp envelopes.

The electron beam-initiated apparatus in the $H_2+N_2F_4$ and $H_2+NF_3$ tests described above is schematically illustrated in FIG. 2 and basically comprises a laser tube or vessel 30, having, for example, a 2 cm. diameter and a 4 cm. length and constructed, for example, of material, such as metal foil, transparent to the electron beam, a pulsed electron beam generator 31, such as an accelerator, and a pair of concave mirrors 32 and 33. The electron beam indicated at 34 generated by generator 31 is illustrated as being perpendicular to the longitudinal axis of laser tube 30 as a matter of convenience but is not required, and is connected with laser tube 30 via a convention beam manipulation or dispersion device 35 through a foil window 36 mounted on the side of laser tube 30. Window 36, for example, may be constructed of 0.001 inches aluminum foil. The laser tube 30 is filled with an explosive gaseous mixture 37, such as $H_2+N_2F_4$ or $H_2+NF_3$. The laser tube 30 is provided at each end thereof with windows 38 and 39, positioned at the Brewster angle and constructed, for example, from $BaF_2$. Mirrors 32 and 33 are positioned in spaced relationships with respect to windows 38 and 39, and define, along with the laser tube 30 and windows 38 and 39, the lasing cavity. For example, the concave mirrors 32 and 33 may be spaced 20 cm. apart, with a 10 m. radius of curvature, and vapor coated with gold. The output beam, indicated at 40 is obtained by placing a beam splitter 41 inside the laser cavity as shown, beam splitter 41 being made, for example, from NaC1. While only the output beam 40 is being considered in this instance, it is recognized that another output beam will be directed from beam splitter 41 in generally the opposite direction from that of beam 40. In the above described tests, and analysis of the laser output was made using a Ge(Au) detector at 77° K. and an infrared (IR) monochrometer, the signal from the detector being measured with an oscilloscope, such as a Tektronix 519, none of which constitute part of the present invention and thus not shown.

With the $H_2+N_2F_4$ mixture, lasing has been obtained from the use of a trace of hydrogen up to a 4-to-1 mixture ratio of the $H_2$ to $N_2F_4$. While it has not yet been determined, it is currently believed that the timewidth (FWHM) and peak power of the generated pulse may depend on the mixture ratio of $H_2$ to $N_2F_4$.

It is hypothesized that the rise time of the generated laser pulse is inversely related to the pressure of the gaseous mixture, on the theory that a chemical reaction rate is proportional to collision rate of the reactant particles. The collision rate increases as pressure increases. Accordingly, the reaction rate would also increase. Recalling that the reaction rate determines the rise time of the generated laser pulse, it has been shown in testing the $H_2+N_2F_4$ mixture that, for the flash-photolysis initiated embodiment, increasing the initial gas pressure from 5 to 10 torr significantly decreased the rise time of the generated laser pulse (from 200 to 100 ns.). Accordingly, at least initial evidence indicates the above hypothesis is correct.

Again, it is pointed out that while the testing of the inventive concept, thus far conducted, has been more extensively directed to the $H_2+N_2F_4$ and $H_2+NF_3$ mixtures the use of pentaborane and tetrafluorohydrazine ($B_5H_9+N_2F_4$), and diborane, and tetrafluorohydrazine ($B_2H_6+N_2F_4$) will lase by both the flashlamp and electron beam technique. In addition methane and tetrafluorohydrazine ($CH_4+N_2F_4$) has been bound to lase by the electron beam technique. Also, as pointed out above, and varifies the advantages of the newly discovered electron-beam-initiated, volumetrically ignited technique, described and claimed in the above referenced copending patent application, the mixtures of $H_2+NF_3$, $B_2H_6+NF_3$ and $B_5H_9+NF_3$ will not lase by the flashlamp technique but will with the electron beam technique. mixtures using molecular hydrogen and difluorodiazone ($H_2+N_2F_2$) have not been sufficiently tested at present to varify the practical application thereof in a lasing system.

It should be noted that it is within the scope of this invention to utilize combinations of the gaseous compounds, and it has been determined that lasing action will occur, at least with the electron beam technique with any combinations or proportions of the above referenced gaseous compounds and reducing agents. Therefore, it is not intended to limit this invention to the use of any specific one of the compounds and reducing agents described above.

Also, while the pressures utilized in tests thus far conducted have not exceeded 250 torr, this value is not a limitation on the pressures available with the electron beam-initiation technique, and from preliminary information now available, it appears that the pressures may be considerably high, quite probably nearing ambient pressure. Thus the example herein set forth is not 250 to be an upper limit of the pressure.

The present inventive concept clearly advances the state of the chemical laser art by providing a reaction that is a branching chain explosive reaction which requires no energy investment above that necessary for initiating the reaction. The chemical reaction also releases energy suitable for pumping a lasing species of the reaction at a sufficient rate to generate an extremely large population inversion. The reaction has additional distinguishing features in that the reaction progresses to completion and the reaction products are gaseous. In addition, the reaction can be uniformly and controllably initiated, and thus suitable for a high power pulsed lasing system.

It is thus seen that the present invention overcomes the disadvantages, as pointed out above, of the prior known pulsed chemical laser systems, and provides explosive gaseous mixtures which can be initiated by flash photolysis and/or an electron beam techniques.

Although particular embodiments of the invention have been illustrated and described, modifications and changes will become apparent to those skilled in the art, and it is intended to cover in the appended claims, all such modifications and changes as come within the spirit and scope of the invention.

What we claim is:

1. A high energy chemical laser system comprising: means defining an optical cavity; an explosive gaseous mixture including a reducing agent providing reactive hydrogen isotope species and nitrogen-fluorine compounds within said cavity; and means for uniformly igniting said gaseous mixture; whereby an exothermic chemical reaction is produced yielding a lasing reaction species, which releases energy suitable for pumping that lasing species at a sufficient rate to generate an extremely large population inversion.

2. The laser system defined in claim 1, wherein said explosive gaseous mixture is selected from the group consisting of $H_2+N_{2n}F_4$, $H_2+N_2F_2$, $H_2+NF_3$, $B_5H_9+N_2F_4$, $B_5H_9+NF_3$, $B_2H_6+NF_3$, $B_2H_6+N_2F_4$, $CH_4+N_2F_4$, $D_2+N_2F_4$, and $T_2+N_2F_4$.

3. The laser system defined in claim 2, wherein said igniting means includes an electron beam generating means.

4. The laser system defined in claim 1, wherein said explosive gaseous mixture is at a pressure ranging from about 10 to 50 torr.

5. The laser system defined in claim 4, wherein said igniting means includes flashlamp means.

6. The laser system defined in claim 1, wherein said explosive gaseous mixture is at a pressure ranging from about 10 to 250 torr.

7. The laser system defined in claim 6, wherein said igniting means includes an electron beam generating means.

8. The laser system defined in claim 6, wherein said explosive gaseous mixture consists essentially of a mixture selected from the group consisting of $H_2+N_2F_4$ and $H_2+NF_3$.

9. The laser system defined in claim 1, wherein said optical cavity defining means includes a vessel within which said explosive gaseous mixture is located, said vessel including at least oppositely positioned window means transparent to light, and mirror means positioned in spaced relationships with respect to said light transparent window means; wherein said explosive gaseous mixture is selected from the group consisting of $H_2+N_2F_4$, $H_2+N_2F_2$, $H_2+NF_3$, $B_5H_9+N_2F_4$, $B_5H_9+NF_3$, $B_2H_6+NF_3$, $B_2H_6+N_2F_4$, $D_2+N_2F_4$, and $T_2+N_2F_4$, and wherein said igniting means includes an electron beam generating means operatively connected to said vessel through a windowlike means transparent to electrons.

10. The laser system defined in claim 1, wherein said hydrogen and nitrogen-fluorine compound mixture consists essential of $H_2+N_2F_4$ mixed in amounts up to a 4-to-1 ratio of $H_2$ to $N_2F_4$.

* * * * *

Notice of Adverse Decision in Interference

In Interference No. 98,304 involving Patent No. 3,623,145, D. W. Gregg and R. K. Pearson, HIGH ENERGY CHEMICAL LASER SYSTEM, final judgment adverse to the patentees was rendered May 6, 1974, as to claims 1, 2, 4 and 5.

[*Official Gazette of September 24, 1974.*]